(12) United States Patent
Speich et al.

(10) Patent No.: US 9,615,498 B2
(45) Date of Patent: Apr. 11, 2017

(54) HAYMAKING MACHINE WITH A COUPLING DEVICE COMPRISING AN IMPROVED RETURN DEVICE

(71) Applicant: KUHN S.A., Saverne (FR)

(72) Inventors: Cedric Speich, Haguenau (FR); Mathieu Schott, Cosswiller (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 14/762,558

(22) PCT Filed: Feb. 4, 2014

(86) PCT No.: PCT/FR2014/050192
§ 371 (c)(1),
(2) Date: Jul. 22, 2015

(87) PCT Pub. No.: WO2014/122387
PCT Pub. Date: Aug. 14, 2014

(65) Prior Publication Data
US 2015/0351310 A1    Dec. 10, 2015

(30) Foreign Application Priority Data

Feb. 7, 2013   (FR) ...................................... 13 51030

(51) Int. Cl.
*A01D 67/00*    (2006.01)
*A01B 61/02*    (2006.01)

(52) U.S. Cl.
CPC ............ *A01B 61/02* (2013.01); *A01D 67/005* (2013.01)

(58) Field of Classification Search
CPC ... A01B 71/063; A01B 59/043; A01B 59/062; A01B 59/06; A01B 59/048;
(Continued)

(56) References Cited

U.S. PATENT DOCUMENTS 3,268,011 A * 8/1966 van der Lely ....... A01B 59/048
172/439
3,572,760 A * 3/1971 Jones ................... A01B 59/062
172/272

(Continued)

FOREIGN PATENT DOCUMENTS

DE    10 2011 007 702 A1    10/2012
FR       2 537 385 A1       6/1984

OTHER PUBLICATIONS

International Search Report issued Sep. 5, 2014, in PCT/FR2014/050192, filed Feb. 4, 2014.

*Primary Examiner* — Robert Pezzuto
(74) *Attorney, Agent, or Firm* — Oblon, McClelland, Maier & Neustadt, L.L.P.

(57) ABSTRACT

A haymaking machine includes a chassis supported directly or indirectly on the ground by wheels and a working device connected to the chassis. The chassis includes a coupling device to which two hitching pieces are articulated each bearing a hitching pin for the hitching to the respective lower arms of a tractor. Each hitching piece cooperates with a respective return device. Each return device storing energy when the corresponding hitching pin moves, relative to the coupling device, upward from a first position. Each return device is able to release that energy to the corresponding hitching pin by returning the hitching pin toward the first position. Each return device stores energy when the corresponding hitching pin moves, relative to the coupling device, downward from a second position, and each return device can release that energy to the corresponding hitching pin by returning the hitching pin toward the second position.

20 Claims, 4 Drawing Sheets

(58) Field of Classification Search
CPC .... A01B 61/00; A01B 61/02; A01D 78/1071; A01D 78/1007; A01D 78/1014; A01D 67/005; B60D 1/167; B60D 1/141; B60D 1/143; B60D 1/62; B60D 1/363
USPC .......... 56/367, 370; 172/272, 439; 180/53.1, 180/53.3; 280/416.1, 442, 508
See application file for complete search history.

(56) References Cited

U.S. PATENT DOCUMENTS

| | | | | |
|---|---|---|---|---|
| 5,918,451 | A * | 7/1999 | Vonesch | A01D 78/1007 56/365 |
| 6,272,826 | B1 * | 8/2001 | Menichetti | A01D 78/1071 56/367 |
| 6,595,299 | B2 * | 7/2003 | Heller | A01B 59/043 172/272 |
| 6,758,285 | B2 * | 7/2004 | Ollefs | B60D 1/363 172/439 |
| 6,874,583 | B2 * | 4/2005 | Wood, Jr. | A01B 59/06 172/439 |
| 6,896,070 | B2 * | 5/2005 | Wood, Jr. | B60D 1/141 172/272 |

* cited by examiner

HAYMAKING MACHINE WITH A COUPLING DEVICE COMPRISING AN IMPROVED RETURN DEVICE

BACKGROUND OF THE INVENTION

The present invention relates to a haymaking machine including a chassis supported directly or indirectly on the ground by wheels and at least one working device connected to the chassis, the chassis including a coupling device to which two hitching pieces are articulated, each bearing a hitching pin for hitching to the respective lower arms of a tractor, each hitching piece cooperating with a respective return device, each return device storing energy when the corresponding hitching pin moves, relative to the coupling device, upward from a first position, and each return device being able to release that energy to the corresponding hitching pin by returning the hitching pin toward the first position.

DESCRIPTION OF THE RELATED ART

A machine of this type is sold by the company POTTINGER under the name "EUROTOP 461 N". This machine, which is in particular described in the "Pottinger EUROTOP—Windrower" brochure dated 2012, is a windrower provided to be hitched to the rear of a tractor. The coupling device includes an arch to which two hitching pieces that extend toward the front are articulated in the lower part. Each hitching piece bears a hitching pin. Above each of these hitching pieces, a support is provided connected to the arch. Each hitching piece cooperates with a respective return device. The latter is formed by a deformable pad of synthetic material fastened from below to each support, and positioned between the corresponding support and hitching piece. When the hitching pin pivots upward relative to the arch, the deformable pad is compressed. The latter therefore stores energy and can release it to the hitching pin. In this way, the upward stroke of the hitching pin is controlled to a certain extent, and the hitching pin is returned downward relative to the arch. However, the downward stroke of each hitching piece is limited by a metal stop. Consequently, the known return device does not store energy during downward pivoting of the hitching pin and does not perform an upward return function for said hitching pin. During work, such a machine evolves at a significant speed on bumpy terrain, and it is driven by a swinging movement in a vertical plane parallel to the direction of advance of the machine. This movement results in a pivoting of the hitching pins from bottom to top and vice versa relative to the arch. Due to the lack of upward return of the hitching pins, the vertical movements of the arch with respect to the tractor are poorly controlled and the machine is unstable. This results in additional forces on the hitching device of the tractor, in particular in the form of impacts and jolts, resulting in driving discomfort for the user. In addition, these poorly controlled vertical movements may deteriorate the quality of the raking because the forks placed at the front of the machine sometimes come off of the ground, and other times scrape the ground and dirty the plants moved with the soil.

BRIEF SUMMARY OF THE INVENTION

The present invention aims to propose a haymaking machine that does not have the aforementioned drawbacks.

To that end, one important feature of the invention lies in the fact that each return device stores energy when the corresponding hitching pin moves, relative to the coupling device, downward from a second position, and that each return device can release that energy to the corresponding hitching pin by bringing the hitching pin back toward the second position.

Each return device storing energy when the corresponding hitching pin moves upward or downward, the vertical movements of the hitching of the machine with respect to the lower arms of the tractor are in large part converted into distortion of said return devices. The transmission of these movements to the lower arms of the tractor is therefore greatly reduced. In particular, the impacts and bumps on the lower arms are greatly decreased. The driving comfort of the machine, during work and transport, is therefore improved. Furthermore, the mechanical stresses on the coupling device and the chassis of the machine are decreased, resulting in an extended lifespan of the machine. In addition, each return device being able to release the energy it has stored by bringing the corresponding hitching pin back toward its initial position, the stability of the machine is increased both in a first vertical plane parallel to the direction of advance and in a second transverse plane. The increased stability in the first plane allows a good quality of work at high speeds of advance, since the height of the working devices relative to the ground is better controlled. In the second plane transverse to the direction of advance, the return device according to the invention increases the stability of the machine in particular when the folding movements of the working devices on either side of the chassis are not symmetrical. Thus, a working device placed to the left of the chassis may be moved between a low work position and a high work position, its right counterpart remaining stationary, without the machine tilting to the left to any significant extent. Furthermore, when the machine turns, the swaying that it experiences is attenuated by the resisting force applied by each return device on the corresponding hitching pin, and by the return effect of the hitching pins toward their occupied position in a straight line.

BRIEF DESCRIPTION OF THE SEVERAL VIEWS OF THE DRAWINGS

Other features and advantages of the invention will emerge from the following description, in reference to the appended drawings, which show several non-limiting example embodiments of the machine according to the invention.

In these drawings.

DETAILED DESCRIPTION OF THE INVENTION

Figure 1:
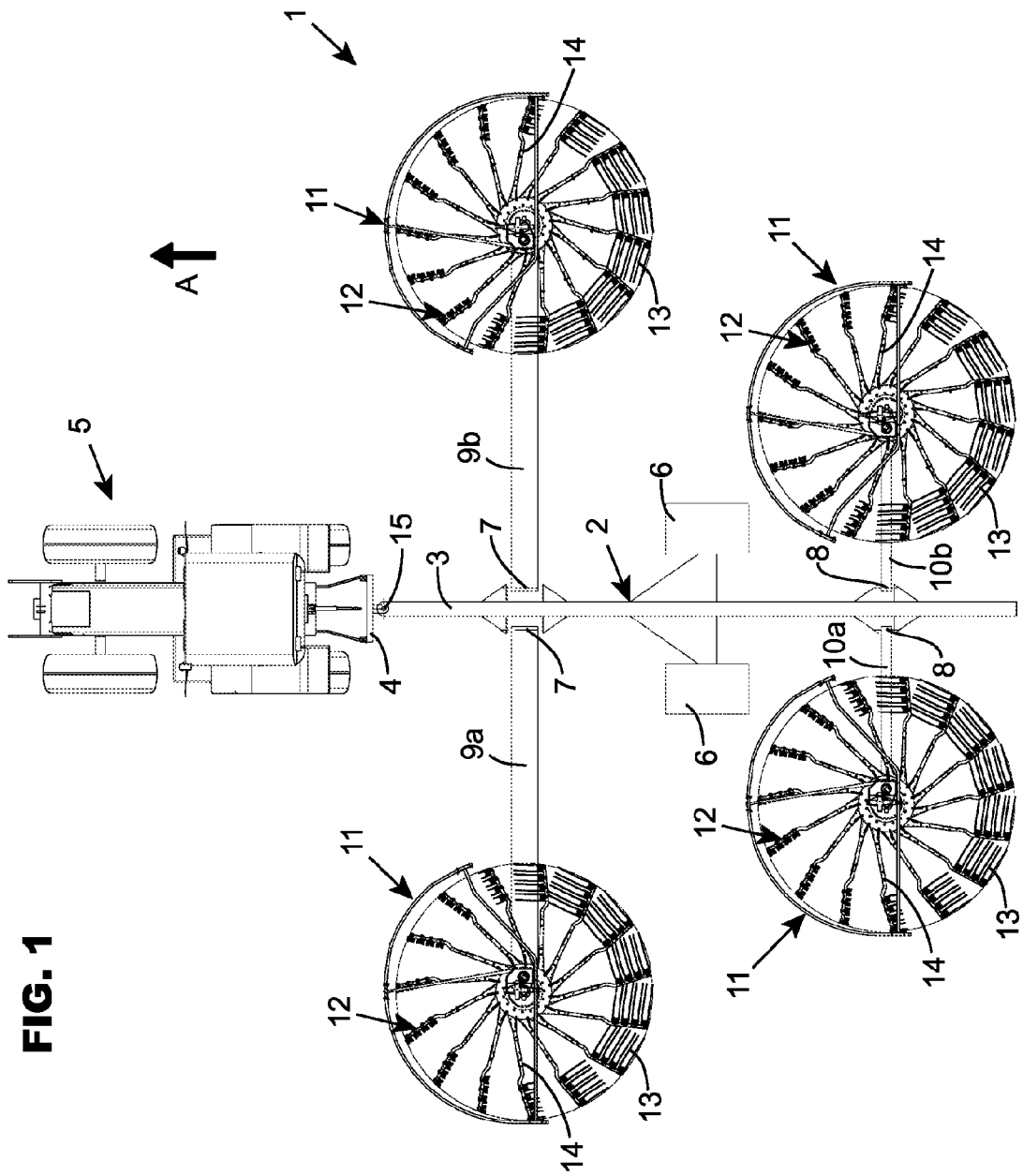
FIG. 1 shows a top view of one embodiment of a machine according to the invention.

As shown in FIG. 1, the machine (1) according to the invention includes a chassis (2) comprising a middle beam (3) that has, at its front end, a coupling device (4) to hitch it to a tractor (5) making it possible to move the machine (1) in a direction of advance (A). In the rest of the description, the notions "front" and "rear" are defined relative to the direction of advance (A), while the notions "bottom" and "top" relate to the ground.

In the embodiment shown in FIG. 1, the chassis (2) is directly supported on the ground by wheels (6). These wheels (6) are mounted on an axle that in turn is connected to the middle beam (3). On each side of the middle beam (3), an arm (9a, 9b, 10a, 10b) that supports a working device (11) is articulated, by means of a substantially horizontal axis (7, 8).

Each working device (11) of the machine (1) according to the invention includes a rotor (12) with work tools (13) intended to move products such as grass or cut straw located on the ground. In the illustrated example, the machine (1) is a windrower for plants lying on the ground. It includes four rotors (12). Two rotors (12) are placed in front of the wheels (6) and two rotors (12) are placed behind the wheels (6). Furthermore, on each side of the middle beam (3) of the chassis (2), the arms (9a, 9b, 10a, 10b) have different lengths. In this way, the rotors (12) placed in front are further away from the middle beam (3) than the rear rotors (12). The plants windrowed by the rotor (12) placed furthest forward on one side of the middle beam (3) can thus be picked up by the rotor (12) positioned furthest back on the same side of the middle beam (3) to form a single, larger windrow. According to another embodiment that is not shown, the machine (1) according to the invention could include two rotors (12), one being placed to the left of the middle beam (3) and the other being placed to the right. The middle beam (3) could also have only one arm and one rotor (12). The machine (1) according to the invention could also be a windrower with a single rotor (12) whereof the rotation axis includes, at its lower end, a support with bearing wheels situated below the rotor (12). In that case, the chassis (2) of the machine (1) would be indirectly supported on the ground by said bearing wheels.

Each rotor (12) includes a casing. The latter is connected to the corresponding arm (9a, 9b, 10a, 10b). Each casing supports a central rotation axis that is substantially vertical or slightly inclined toward the front. That rotation axis includes, at its lower end, a support with bearing wheels situated below the rotor (12). The latter rolls on the ground during the work and cause the rotors (12) to follow the unevenness of the ground. The support and the bearing wheels can advantageously slide along the rotation axis so as to adjust the distance of the work tools (13) relative to the ground, for example by means of a jack.

On the part of the rotation axis that extends below the casing, a housing is positioned. The latter is mounted on the rotation axis by means of bearings so as to be able to be driven in rotation. The upper side of the housing is provided with a toothed wheel situated in the casing. That wheel meshes with a pinion, which can be connected to a power take-off of the tractor (5) by means of intermediate transmission shafts known by those skilled in the art. The rotational driving of the rotor (12) could also be done with a hydraulic or electric motor. Each rotor (12) includes a multitude of arms (14) supporting the work tools (13), such as forks. In the case at hand, this involves oscillating arms (14) supported by the housing. These arms (14) extend in the form of spokes relative to the rotation axis, in a plane substantially perpendicular thereto. The oscillating arms (14) include an inner part connected to the housing and an outer part supporting the work tools (13). The inner parts of the oscillating arms (14) are connected to the housing by one or more bearings so as to be able to rotate around themselves. On the part of the rotation axis that is situated in the housing, a fixed cam is mounted intended to control the oscillating arms (14) during the windrowing work. To that end, each of the oscillating arms (14) has, at its end that extends inside the housing, a lever with a roller that is guided in a groove of the cam. During work, the work tools (13) pick up the products, in particular on the front part of their trajectory, and deposit them in the form of a windrow in the side part of their trajectory.

Each arm (9a, 9b, 10a, 10b) is equipped with a hydraulic jack that makes it possible to pivot it around the axis (7, 8). Each hydraulic jack is articulated with one of its ends on the middle beam (3) and with its other end on the corresponding arm (9a, 9b, 10a, 10b). Each hydraulic jack may be double-acting so as to be able to be controlled during the extension and shortening, and makes it possible to move the corresponding arm (9a, 9b, 10a, 10b) between a transport position and a work position. In the transport position, each rotor (12) extends in a plane that is substantially vertical or close to the vertical, such that the bulk of the machine (1) is reduced in terms of width. In the work position, each rotor (12) extends in a substantially horizontal plane. Each rotor (12) can also be placed in an intermediate position situated between the work position and the transport position. In that intermediate position, the rotors (12) are raised at some distance above the ground so as to pass above windrows already formed or over obstacles.

Figure 2:
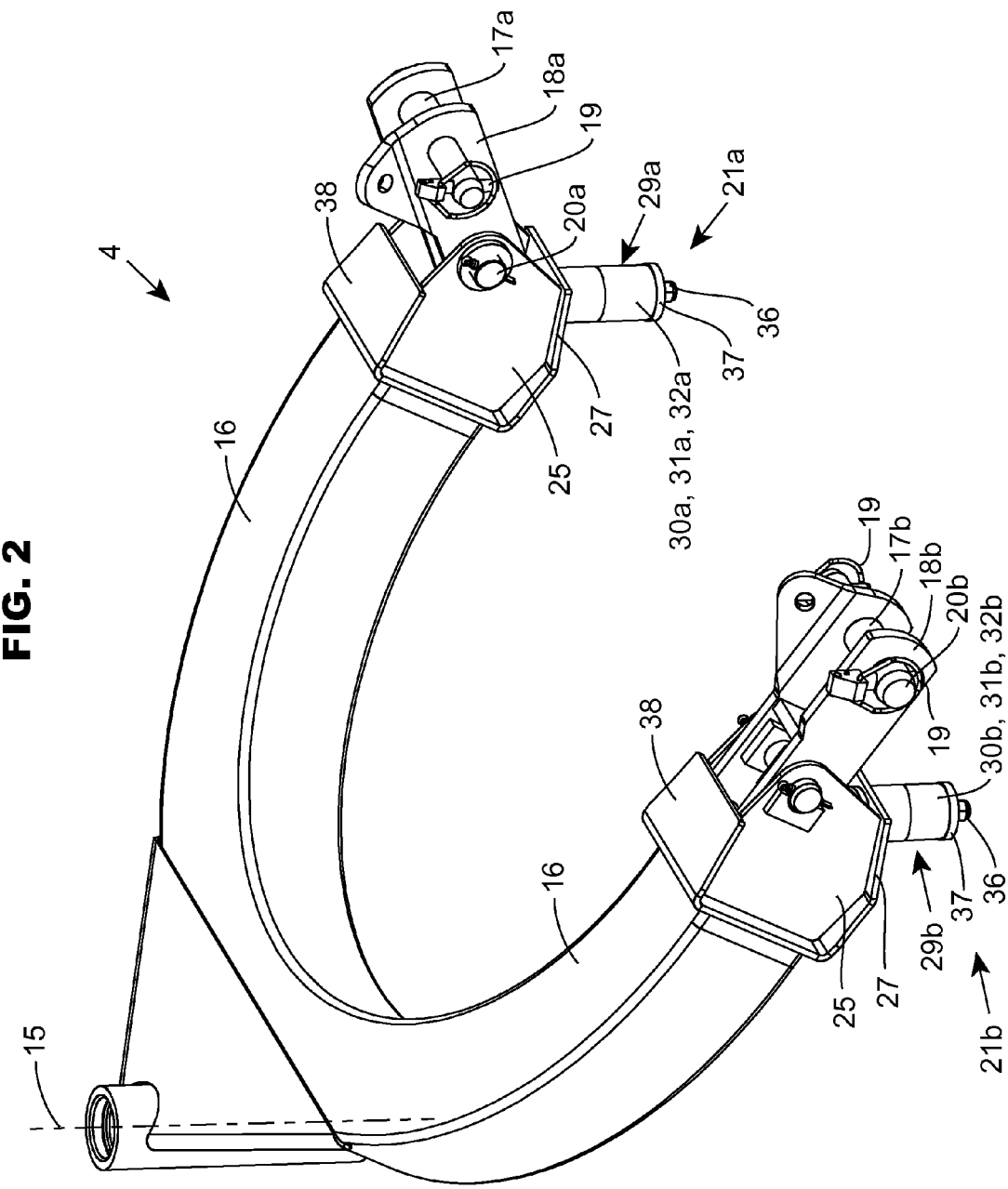
FIG. 2 shows a partial perspective view of a first example embodiment of a machine according to the invention.
Figure 3:
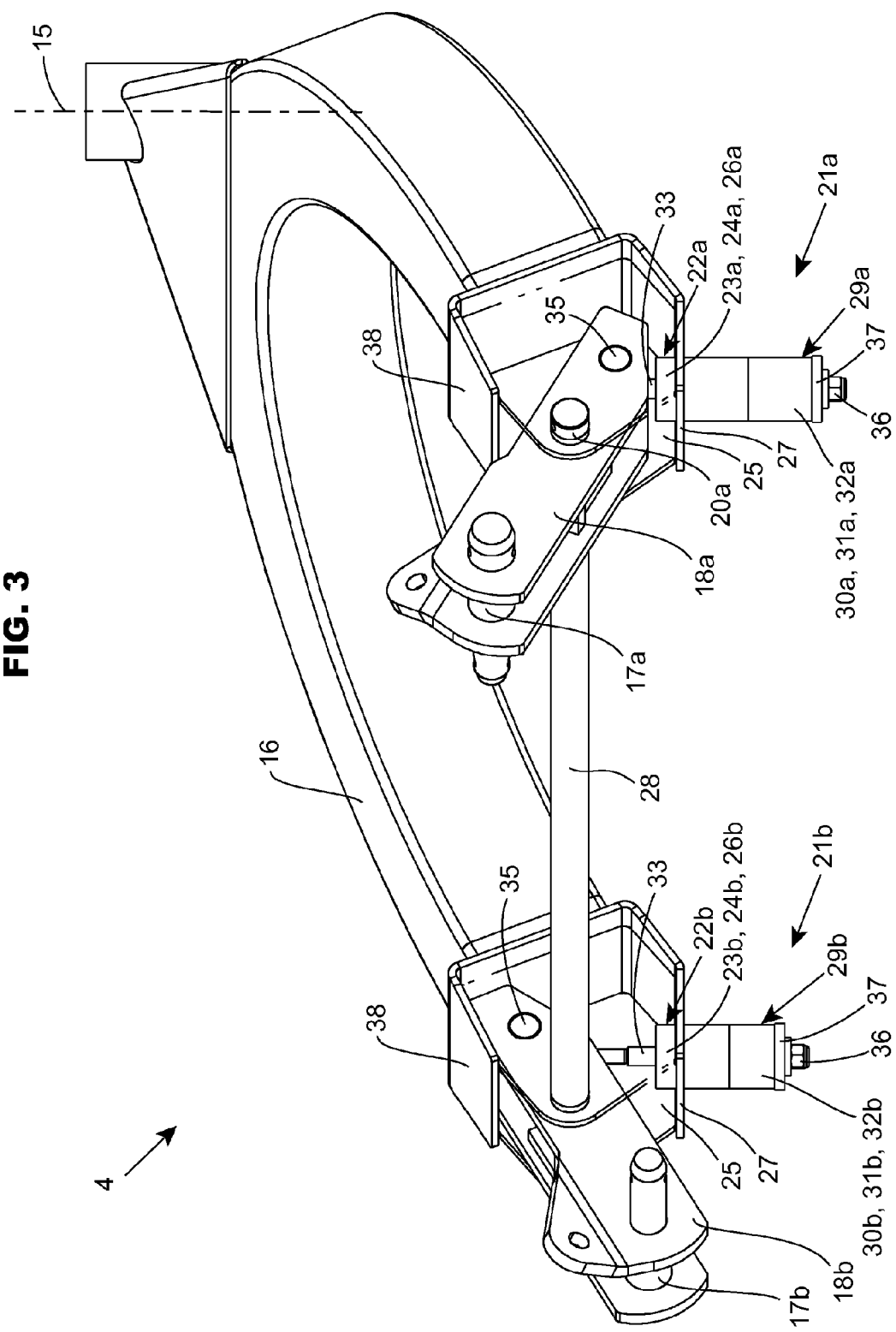
FIG. 3 shows a partial perspective view of a second example embodiment of a machine according to the invention.

As shown in FIGS. 2 and 3, the coupling device (4) placed in front of the chassis (2) is articulated to the middle beam (3) of the chassis (2) by means of a swivel pin (15) that is for example substantially vertical or slightly tilted upward and forward. The coupling device (4) includes two legs (16) that extend in front of said swivel pin (15) so as to give the coupling device (4) an arched shape. Two hitching pieces (18a, 18b) each bearing a hitching pin (17a, 17b) for hitching to the respective lower arms of the tractor (5) are articulated to the coupling device (4). Each hitching piece (18a, 18b) is for example U-shaped. Each hitching pin (17a, 17b) is connected to the corresponding hitching piece (18a, 18b) such that it can be disassembled for example by means of pins (19) passing through the hitching pin (17a, 17b) and placed on either side of the hitching piece (18a, 18b). Each hitching piece (18a, 18b) is articulated to a respective leg (16) of the coupling device (4) by means of a substantially horizontal pin (20a, 20b) substantially perpendicular to the direction of advance (A) of the machine (1). Each hitching pin (17a, 17b) is placed in front of said corresponding pin (20a, 20b) around which the hitching pin (17a, 17b) can pivot upward or downward. The coupling device (4) could also bear two hitching pieces (18a, 18b) in an articulated manner each incorporating the hitching pin (17a, 17b), thus making each hitching piece (18a, 18b) L-shaped.

According to the invention, each hitching piece (18a, 18b) cooperates with a respective return device (21a, 21b). Each return device (21a, 21b) stores energy when the corresponding hitching pin (17a, 17b) moves, relative to the coupling device (4), upward from a first position. This first position is defined as being the position of the hitching pin (17a, 17b) from which the corresponding return device (21a, 21b) begins to store energy, or its stored energy begins to increase, due to a movement of the hitching pin (17a, 17b) upward relative to the coupling device (4). Each return device (21a, 21b) can release that energy to the corresponding hitching pin (17a, 17b) by returning the hitching pin (17a, 17b) to the first position. Additionally, each return device (21a, 21b) stores energy when the corresponding hitching pin (17a, 17b) moves, relative to the coupling device (4), downward from a second position. This second position is defined as the position of the hitching pin (17a, 17b) from which the corresponding return device (21a, 21b) stores energy, or sees its stored energy increase, due to a movement of the hitching pin (17a, 17b) downward relative to the coupling device (4). Each return device (21a, 21b) can release that energy to the corresponding hitching pin (17a, 17b) by returning the hitching pin (17a, 17b) toward the second position.

Each return device (21a, 21b) includes a first return means (22a, 22b). The first return means (22a, 22b) stores energy when the corresponding hitching pin (17a, 17b) moves, relative to the coupling device (4), upward from the first position. Each first return means (22a, 22b) can release that energy to the corresponding hitching pin (17a, 17b) by bringing the latter back toward the first position.

Each first return means (22a, 22b) includes a first elastically deformable element (23a, 23b). FIG. 2 illustrates a first example embodiment of a coupling device (4) according to the invention, a detailed view of which is also provided in FIG. 4. In this example embodiment, at least one first elastically deformable element (23a, 23b) includes a first compression element (24a, 24b) acting between a support (25) of the coupling device (4) and a corresponding hitching pin (17a, 17b). According to one embodiment that is not shown, the first elastically deformable element (23a, 23b) could include a spring, for example a coil spring. The first compression element (24a, 24b) could include an open coil spring, a tapered washer or a stack of such washers. According to another embodiment that is not shown, the first elastically deformable element (23a, 23b) could include a plate-spring oriented in the direction of advance (A) of the machine (1). This plate-spring would be connected on the one hand to the corresponding hitching piece (18a, 18b) and on the other hand to the coupling device (4).

In the first example embodiment, the first elastically deformable element (23a, 23b) includes a pad (26a, 26b) of elastomer material, for example a rubber pad. The pad (26a, 26b) is inserted between a lower metal sheet (27) of the support (25) and an end of the hitching piece (18a, 18b) opposite the other end bearing the hitching pin (17a, 17b). When the hitching pin (17a, 17b) pivots upward relative to the coupling device (4), the pad (26a, 26b) compresses elastically and thereby accumulates a potential energy that it can next release to the hitching pin (17a, 17b) in the form of a pivoting of said hitching pin (17a, 17b) downward.

Furthermore, in this first example embodiment illustrated in FIG. 2, the return device (21a) acts independently of the other return device (21b). In fact, the return device (21a) can store or release energy to the corresponding hitching pin (17a) without the same thing necessarily occurring with the other return device (21b). It will also be noted that the hitching pin (17a) can move without that movement necessarily involving a movement of the other hitching pin (17b).

A second example embodiment of a coupling device (4) according to the invention is shown in FIG. 3. This second embodiment differs from the first in that at least one first elastically deformable element (23a, 23b) includes a torsion bar (28) directly or indirectly connected to the coupling device (4) and the corresponding hitching pin (17a, 17b). The detailed view provided in FIG. 4 also addresses this second example embodiment. In that example, the torsion bar (28) is, at each of its ends, rigidly fastened to the pin (20a, 20b) connecting the corresponding hitching piece (18a, 18b) to the coupling device (4). The torsion bar (28) is indirectly connected to the coupling device (4) and the hitching pins (17a and 17b) via the hitching pieces (18a, 18b). The torsion bar (28) could thus be directly connected to the coupling device (4). Thus, the torsion bar (28) could, in its central part, be guided in a sleeve of the coupling device (4) forming a pivot.

In the second example embodiment shown in FIG. 3, a first return means (22a) is made up of the first compression element (24a) associated with a hitching pin (17a), while the other first return means (22b) is made up of the first compression element (24b) associated with the other hitching pin (17b) and the torsion bar (28) connecting the two hitching pieces (18a and 18b). The torsion bar (28) can store and release energy irrespective of the direction in which it experiences torsion. Consequently, said other first return means (22b) stores energy as well when the corresponding hitching pin (17b) moves, relative to the coupling device (4), downward from the second position. Furthermore, this other first return means (22b) can release that energy to the corresponding hitching pin (17b) by bringing the hitching pin (17b) back toward the second position.

In another example embodiment, not shown, it would also be conceivable for a first return means (22a) to be made up of a first compression element (24a) acting between a hitching pin (17a) and the corresponding support (25), and for the other return means (22b) to be made up of a torsion bar (28) that connects the hitching piece (18a) bearing said hitching pin (17a) to the other hitching pin (17b). It would also be conceivable for each first return means (22a, 22b) to include, for sole elastic element, a torsion bar. In that case, each torsion bar would for example be fixed with the coupling device (4) in a middle part thereof. Furthermore, each torsion bar would extend from said middle part toward a corresponding hitching piece (18a, 18b) with which the bar would be connected.

In the second example embodiment of FIG. 3, the return device (21a) interacts with the other return device (21b). In fact, the torsion bar (28) connected to the two hitching pieces (18a and 18b) means that the movements of the hitching pin (17a) are, to a certain extent, transmitted to the other hitching pin (17b). Consequently, a distortion of the return device (21a) causes a distortion of the other return device (21b).

According to one important feature of the invention, at least one of the return devices (21a, 21b) includes a second return means (29a, 29b). The second return means (29a, 29b) stores energy when the corresponding hitching pin (17a, 17b) moves, relative to the coupling device (4), downward from the second position. The second return means (29a, 29b) can release that energy to the corresponding hitching pin (17a, 17b) by returning the hitching pin (17a, 17b) toward the second position.

Figure 4:
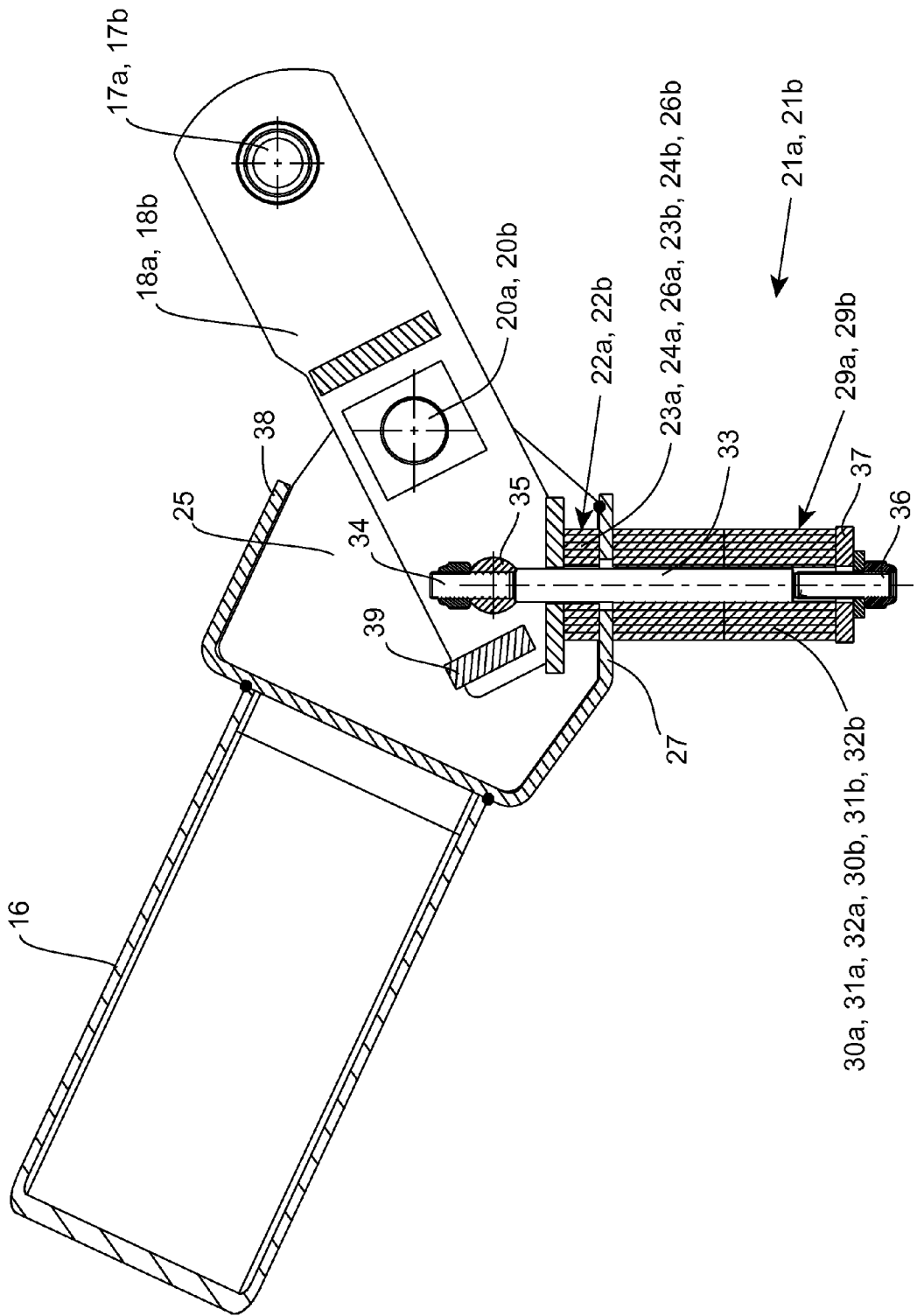
FIG. 4 shows a sectional view of part of the first and second example embodiments.

At least one second return means (29a, 29b) includes a second elastically deformable element (30a, 30b). The latter can, similarly to the first elastically deformable element (23a, 23b), include a coil spring or a plate-spring, or further a pad (31a, 31b) of elastomer material. This list is not limiting. In the first and second example embodiments, each return device (21a, 21b) includes a second return means (29a, 29b). Furthermore, each second return means (29a, 29b) includes a second elastically deformable element (30a, 30b). In the aforementioned example embodiments, the latter includes a second compression element (32a, 32b), in the case at hand a pad (31a, 31b) of elastomer material, acting between the support (25) of the coupling device (4) and the corresponding hitching pin (17a, 17b). As shown by FIG. 4, each return device (21a, 21b) further includes a rod (33) positioned parallel to the corresponding first and second elastically deformable elements (23a, 23b, 30a, 30b). An upper end (34) of the rod (33) is connected in an articulated manner to the hitching piece (18a, 18b) bearing the corresponding hitching pin (17a, 17b). To that end, the rod (33) passes through an axis (35) by means of which it is pivotably connected to the corresponding hitching piece (18a, 18b). The rod (33) passes through the pad (26a, 26b) of the first elastically deformable element (23a, 23b). Sufficient play is provided between the rod (33) and said pad (26a, 26b) to enable the rod (33) to slide freely inside said pad (26a, 26b). The rod (33) next passes through the lower metal sheet (27) of the support (25), within which it can slide freely. The rod (33) next passes through the pad (31a, 31b) of the second elastically deformable element (30a, 30b). At its lower end (36) away from the hitching pin (17a, 17b), the rod (33) bears a washer (37) such that the second elastically deformable element (30a, 30b) in the form of a pad (31a, 31b) acts between the lower metal sheet (27) of the support (25) and said lower end (36). In this way, a downward pivoting of the hitching pin (17a, 17b) relative to the coupling device (4) causes a compression of the pad (31a, 31b) of the second return means (29a, 29b).

Another embodiment not shown differs from that of FIG. 4 in that the return device (21a, 21b) includes an additional rod cooperating with the first elastically deformable element (23a, 23b). In that case, instead of being inserted between the lower metal sheet (27) of the support (25) and the hitching piece (18a, 18b), the first elastically deformable element (23a, 23b) is placed above an upper metal sheet (38) of the support (25). The lower end of the additional rod is articulated to the hitching piece (18a, 18b) bearing the hitching pin (17a, 17b), similarly to what is provided for the rod (33) cooperating with the second elastically deformable element (30a, 30b). This additional rod bears a washer at its upper end away from the hitching pin (17a, 17b) and extends parallel to the first elastically deformable element (23a, 23b), through which it preferably passes. In this way, the first elastically deformable element (23a, 23b) acts between the upper metal sheet (38) of the support (25) and said upper end of the additional rod.

According to one preferred feature of the invention, the second return means (29a, 29b) associated with a hitching pin (17a, 17b) has a lower stiffness than that of the first return means (22a, 22b) associated with said hitching pin (17a, 17b). In the first and second example embodiments, this feature is obtained by the fact that each elastically deformable element (30a, 30b) is made from a material with a hardness substantially identical to that of the material making up the corresponding first elastically deformable element (23a, 23b) and by the fact that said second elastically deformable element (30a, 30b) has a greater height than said first elastically deformable element (23a, 23b). The second elastically deformable element (30a, 30b) is for example made of a stack of several elastically deformable washers. Different stiffnesses could also be obtained using materials with different hardnesses. The aforementioned feature contributes to reducing the mechanical stresses on the machine (1), in particular when the latter turns. In fact, in such a case, the machine (1) adopts a certain swaying, which results in the fact that the machine (1) bears on its hitching pin placed on the outside of the turn, for example the hitching pin (17a), while the hitching pin (17b) positioned on the inside of the turn is offloaded to a certain extent. This means, in the example embodiments of the figures, that a compression is experienced by the first compression element (24a) associated with the hitching pin (17a) outside the turn and by the second compression element (32b) associated with the inner hitching pin (17b). Given that the stiffness of the second compression element (32b) is lower than that of the first (24a), the hitching pin (17b) inside the turn can, with relative ease, pivot downward relative to the coupling device (4). Conversely, the hitching pin (17a) outside the turn is firmly retained by the first compression element (24a) that is associated with it due to the greater stiffness thereof. In this way, the respective return devices (21a and 21b) authorize a certain swaying of the coupling device (4) of the machine (1) relative to the tractor (5), which eliminates the risk of excessive mechanical stresses on the machine (1). Nevertheless, the swaying of the machine (1) remains controlled by the resisting force applied by the second return means (29b) on the corresponding hitching pin (17b). Furthermore, at the end of the turn, the hitching pins (17a and 17b) are brought back to the position that they occupy in a straight line owing to the return effect generated by the respective return devices (21a and 21b).

In FIG. 4, the hitching pin (17a, 17b) is shown in an empty balance position, corresponding to the machine (1) not hitched to the tractor (5). According to one preferred feature of the invention, the first position and the second position of the hitching pin (17a, 17b) are coincident with this balance position. The hitching pin (17a, 17b) cannot freely leave that balance position, since it is subject both to the resisting force of the first return means (22a, 22b) and to that of the second return means (29a, 29b). In order to obtain that effect, the first and second compression elements (24a, 24b, 32a, 32b) visible in FIG. 4 can for example be slightly pre-stressed in the balance position. In this way, when, due to the movements of the machine (1) hitched to the tractor (5), the hitching pin (17a, 17b) leaves that balance position and pivots upward, the first compression element (24a, 24b) sees its stored energy increase. The same is true for the second compression element (32a, 32b) when the hitching pin (17a, 17b) leaves the balance position and pivots downward. It is also possible for the respective lengths of the first and second compression elements (24a, 24b, 32a, 32b) in the balance position to be substantially equal to their respective free lengths. In that case, the energy stored by the first and second compression elements (24a, 24b, 32a, 32b) in the balance position is substantially zero. The first compression element (24a, 24b) begins to store energy when the hitching pin (17a, 17b) moves upward relative to the coupling device (4). The same is true for the second compression element (32a, 32b) when the hitching pin (17a, 17b) moves downward.

As also shown by FIG. 4, each hitching piece (18a, 18b) is connected to a stop (39). When each hitching pin (17a, 17b) moves, relative to the coupling device (4), downward from the second position, the distortion of the corresponding return device (21a, 21b) is limited by said stop (39) bearing against the corresponding support (25) of the coupling device (4). In particular, it can be inferred from FIG. 4 that the compression of the second elastically deformable element (30a, 30b) is maximal when the stop (39) comes into contact with the upper metal sheet (38) of the support (25). In FIGS. 2 and 3, the hitching pin (17b) and the return device (21b) are shown in the configuration where the stop (39) bears against the upper metal sheet (38). One can in particular see that the corresponding second elastically deformable element (30b) is shorter than the other second elastically deformable element (30a). In this way, excessive mechanical stresses on the return device (21a, 21b) are avoided.

The invention is of course not limited to the example embodiments described above and shown in the appended figures. Modifications remain possible, in particular regarding the composition, arrangement or number of the various elements or by substituting technical equivalents, without departing from the scope of protection.

The invention claimed is:

1. A haymaking machine, comprising
a chassis supported on the ground by wheels and at least one working device connected to the chassis, the chassis including a coupling device to which a first hitching piece and a second hitching piece are articulated, each of the first and second hitching pieces bearing a hitching pin for hitching to respective first and second lower arms of a tractor,
wherein the first and second hitching pieces respectively cooperate with a first return device and a second return device,
wherein each of the first and second return devices stores energy when the corresponding hitching pin moves, relative to the coupling device, upward from a first position, and each of the first and second return devices being able to release that energy to the corresponding hitching pin by returning the hitching pin toward the first position, and
wherein each of the first and second return devices stores energy when the corresponding hitching pin moves, relative to the coupling device, downward from a second position, and each of the first and second return devices can release that energy to the corresponding hitching pin by returning the hitching pin toward the second position.

2. The haymaking machine according to claim 1, wherein each of the first and second hitching piece is articulated to the coupling device by a substantially horizontal pin substantially perpendicular to a direction of advance of the machine.

3. The haymaking machine according to claim 1, wherein the first return device acts independently of the second return device.

4. The haymaking machine according to claim 1, wherein the first return device interacts with the second return device.

5. The haymaking machine according to claim 1, wherein each of the first and second return devices includes a first return means, each of the first return means stores energy when the corresponding hitching pin moves, relative to the coupling device, upward from the first position, and each of the first return means can release that energy to the corresponding hitching pin by returning the hitching pin toward the first position.

6. The haymaking machine according to claim 5, wherein at least one of the first return means stores energy when the corresponding hitching pin moves, relative to the coupling device, downward from the second position, and each of the first return means can release that energy to the corresponding hitching pin by returning the hitching pin toward the second position.

7. The haymaking machine according to claim 5, wherein at least one of the first and second return devices includes a second return means, said second return means stores energy when the corresponding hitching pin moves, relative to the coupling device, downward from the second position, and said second return means can release that energy to the corresponding hitching pin by returning the hitching pin toward the second position.

8. The haymaking machine according to claim 1, wherein the first position and the second position of each hitching pin are coincident.

9. The haymaking machine according to claim 5, wherein each of the first return means includes a first elastically deformable element.

10. The haymaking machine according to claim 7, wherein the second return means includes a second elastically deformable element.

11. The haymaking machine according to claim 9, wherein at least one first elastically deformable element includes a first compression element acting between a corresponding support of the coupling device and a corresponding hitching pin.

12. The haymaking machine according to claim 9, wherein at least one first elastically deformable element includes a torsion bar connected to the coupling device and to the corresponding hitching pin.

13. The haymaking machine according to claim 10, wherein the second elastically deformable element includes a second compression element acting between a corresponding support of the coupling device and a corresponding hitching pin.

14. The haymaking machine according to claim 9, wherein each of the first elastically deformable elements includes a pad of elastomer material.

15. The haymaking machine according to claim 9, wherein at least one of the first and second return devices includes at least one rod positioned parallel to the corresponding first elastically deformable element, one end of the rod is connected to the corresponding hitching piece, and the first elastically deformable element acts between a corresponding support of the coupling device and another end of the rod away from the corresponding hitching pin.

16. The haymaking machine according to claim 15, wherein the at least one rod passes through the corresponding first elastically deformable element.

17. The haymaking machine according to claim 15, wherein the at least one rod is articulated to the corresponding hitching piece.

18. The haymaking machine according to claim 7, wherein the second return means has a lower stiffness than that of the first return means.

19. The haymaking machine according to claim 1, wherein each of the first and second hitching pieces is connected to a stop, and a distortion of each of the first and second return devices, when the corresponding hitching pin moves, relative to the coupling device, downward from the second position, is limited by said stop bearing against a support of the coupling device.

20. The haymaking machine according to claim 10, wherein the second elastically deformable element includes a pad of elastomer material.

* * * * *